(12) United States Patent
Creek

(10) Patent No.: US 6,758,569 B2
(45) Date of Patent: Jul. 6, 2004

(54) METHOD OF CONSTRUCTING A THIN FILM MIRROR

(75) Inventor: Roy Edward Creek, Newick (GB)

(73) Assignee: SEOS Limited, West Sussex (GB)

( * ) Notice: Subject to any disclaimer, the term of this patent is extended or adjusted under 35 U.S.C. 154(b) by 0 days.

(21) Appl. No.: 09/900,104

(22) Filed: Jul. 6, 2001

(65) Prior Publication Data

US 2002/0003674 A1 Jan. 10, 2002

(30) Foreign Application Priority Data

Jul. 7, 2000 (GB) .............................................. 0016777

(51) Int. Cl.⁷ .............................. G02B 5/08; G02B 7/188
(52) U.S. Cl. ...................... 359/846; 359/847; 359/900
(58) Field of Search ................................ 359/900, 846, 359/847, 848, 871, 872

(56) References Cited

U.S. PATENT DOCUMENTS

| | | | | |
|---|---|---|---|---|
| 2,952,189 A | * | 9/1960 | Pajes | |
| 3,514,776 A | * | 5/1970 | Mulrsady | |
| 3,893,755 A | * | 7/1975 | Cobarg et al. | |
| 3,936,159 A | * | 2/1976 | Pavenick | |
| 4,059,346 A | * | 11/1977 | Levine et al. | |
| 4,106,484 A | * | 8/1978 | Dame | |
| 4,162,825 A | * | 7/1979 | Dowty | |
| 4,288,146 A | * | 9/1981 | Johnson, Jr. et al. | |
| 4,422,723 A | * | 12/1983 | Williams, Jr. et al. | |
| 4,592,717 A | | 6/1986 | Albert | |
| 4,890,903 A | * | 1/1990 | Treisman et al. | |
| 5,109,300 A | * | 4/1992 | Waddell | |
| 5,552,006 A | | 9/1996 | Soliday et al. | |
| 5,997,146 A | | 12/1999 | Denham et al. | |
| 6,050,692 A | | 4/2000 | Creek | |
| 6,113,242 A | * | 9/2000 | Marker et al. | |

FOREIGN PATENT DOCUMENTS

| | | |
|---|---|---|
| DE | 372114 A1 | 5/1988 |
| GB | 952115 | 7/1962 |
| GB | 2314 424 A | 12/1997 |
| WO | WO 97/31277 | 8/1997 |

* cited by examiner

Primary Examiner—Ricky D. Shafer
(74) Attorney, Agent, or Firm—Iandiorio & Teska

(57) ABSTRACT

A method of constructing a thin film mirror, which method comprises:

(i) providing a suction chamber (2) with edges (4) which lie on a required mirror surface;

(ii) providing tensioning means which is forced into contact with film (8) adjacent to at least one of the edges of the suction chamber such that tension in the film parallel to the edge is increased; and (iii) providing holding means (12) for
  (a) holding the tensioning means (10);
  (b) locally adjusting holding pressure on the tensioning means (10); and
  (c) feeding the tensioning means (10) into position after the film (8) has been attached to the suction chamber (2).

7 Claims, 2 Drawing Sheets

METHOD OF CONSTRUCTING A THIN FILM MIRROR

This invention relates to a method of constructing a thin film mirror.

The use of thin film mirrors in large types of visual display apparatus is well known. Thus, for example, it is well known to use thin film mirrors of a concave near-spherical form in collimated displays for use in simulators. The simulators may be used for a wide variety of purposes including training, research, leisure and entertainment.

The thin film mirrors are usually constructed by fixing the film across an open face of an otherwise enclosed chamber. The edges of the chamber to which the film is attached lie on the surface of the desired mirror shape. In the case of simulator display apparatus, the mirror chamber is usually part of a sphere which is bounded at its top and bottom by lines of latitude. Left and right hand ends of the mirror chamber may be lines of longitude or more complicated arrangements.

When first applied, the film is lightly tensioned such that it forms part of the frustum of a cone. The chamber is then partially evacuated, and the greater external air pressure then forces the film into the desired mirror shape. The accuracy of the mirror shape is a major factor in the quality of the image provided by the display apparatus. The chamber edges, the means by which the film is attached to the chamber edges, and how the film stretches as the chamber is evacuated, are all factors which affect the final shape of the mirror. Various methods are known for improving the accuracy of the mirror shape in these areas.

It will be appreciated that the film must stretch in going from a cone to a sphere. In vertical section, the film must stretch from a straight line to a circular arc. In horizontal section, the film must stretch from a circular arc to a longer circular arc. However, where the film attaches to the fixed chamber edges, the film cannot stretch parallel to the edge. Thus, the stretch is not uniform across the film. The reduced stretch near the edges of the film results in locally lower tension in the film, and a departure from the ideal shape. In vertical section, the film follows a "bathtub" curve, with a good curvature over the central region but sharply changing curvature near the edges.

A known process to improve the mirror edge accuracy is to over-stretch the film initially, for up to a few hours, before relaxing the film to its design position. However, this still leaves a significant band of poor mirror around the edge. This band of poor mirror results in objectionable distortion in the image of the display apparatus. To produce an acceptable mirror, it is therefore necessary to make the mirror larger and then cover up the poor edge, thereby leaving the required area of useable mirror in the center.

It will be appreciated that, as the display apparatus becomes larger, it becomes more costly to manufacture the display apparatus. Also, the greater mass of the display apparatus imposes an increasing load on support parts of the display apparatus. Still further, since the display apparatus is usually mounted on some kind of motion system, the motion system expands, requiring a larger and more expensive building to house the display apparatus, for example a simulator. Film of adequate quality is only available up to a certain width, and this also limits the size of the display apparatus. Such limitations usually result in compromises in the size of the covered edge, so that some distortion is still seen around the edge of the image. Vertical linearity of the image may also be compromised.

It is an aim of the present invention to provide a method of constructing a thin film mirror, which method results in a thin film mirror having an improved edge quality without the need for a substantial increase in the size of the thin film mirror.

Accordingly, the present invention provides a method of constructing a thin film mirror, which method comprises:
  (i) providing a suction chamber with edges which lie on a surface of the thin film mirror being constructed;
  (ii) providing tensioning means which is forced into contact with a film which is for the thin film mirror being constructed, the tensioning means being positioned adjacent to and inwardly of at least one of the edges of the suction chamber such that tension in the film parallel to the edge is increased by the tensioning means moving the film in a direction into the suction chamber; and
  (iii) providing holding means for
    (a) holding the tensioning means;
    (b) locally adjusting holding pressure on the tensioning means; and
    (c) feeding the tensioning means into position after the film has been attached to the suction chamber.

The method of the present invention is able to provide a thin film mirror having an improved edge quality, without the need to substantially increase the size of the thin film mirror.

The method of constructing the thin film mirror may be one in which the tensioning means is a rod. Preferably the rod is of circular cross section but the rod may be of any suitable and appropriate cross sectional shape if desired, for example rectangular, square, elliptical, triangular, or combinations of shapes. Generally the tensioning means should present a smooth face to the film so as not to damage the film. Where the tensioning means is a rod of circular cross section, then the rod may be a tube or a solid rod. The tensioning means may be semi-rigid, for example a semi-rigid tube.

The holding means may have a first portion for extending over the tensioning means, and a second portion for extending under the suction chamber. The holding means may be of any suitable and appropriate shape. The holding mans may operate like a clamp.

The present invention also provides a thin film mirror when produced by the method of the invention.

Embodiments of the invention will now be described solely by way of example and with reference to the accompanying drawings in which.

Figure 1:
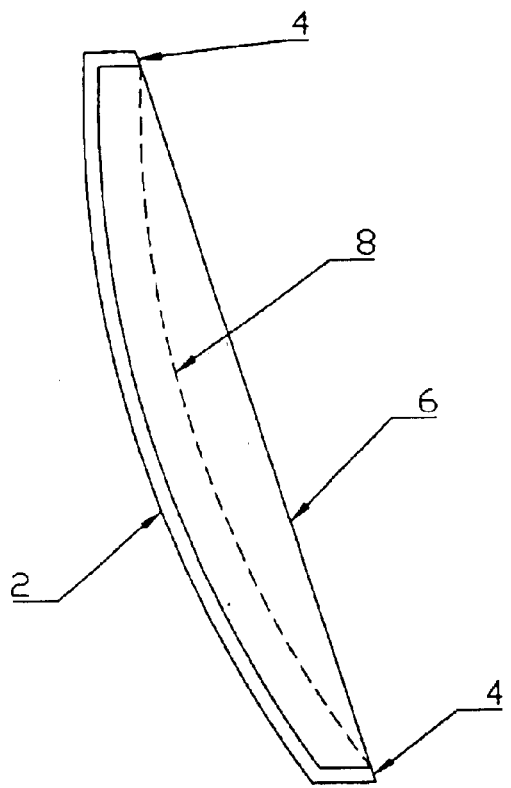
FIG. 1 is a cross section of a known suction chamber in use for producing a thin film mirror.
Figure 2:
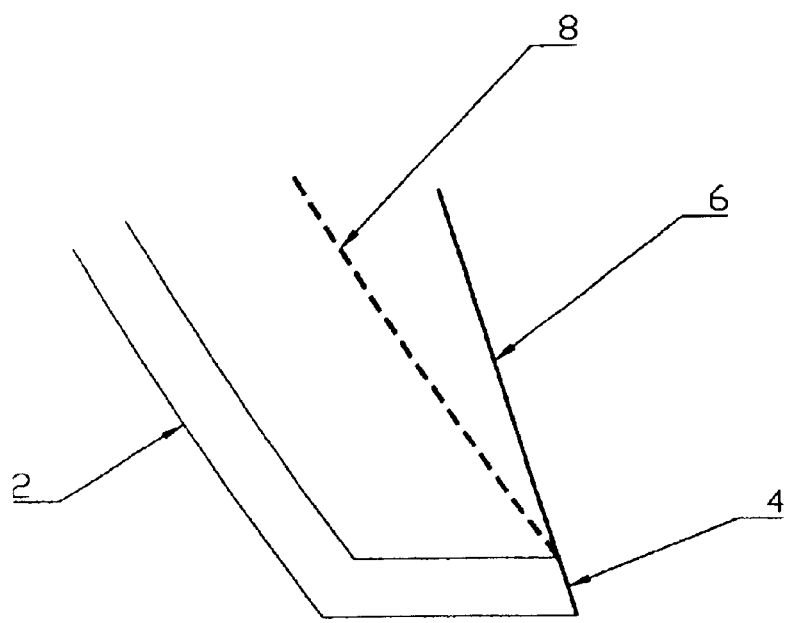
FIG. 2 is an enlargement of the lower part of the known suction chamber shown in FIG. 1 and shows in more detail how mirror film is attached to an edge of the suction chamber.

Referring to FIGS. 1 and 2, there is shown a known suction chamber 2 having attachment edges 4 which lie on a required mirror surface. Mirror film 6 is secured to the attachment edges 4 and it is lightly tensioned such that it forms part of the frustum of a cone. The suction chamber 2 is then partially evacuated and the greater external air pressure forces the mirror film 6 into an approximately spherical shape 8. As mentioned above, the accuracy of the mirror shape is a major factor in the quality of the image provided when the produced thin film mirror is used in large scale display apparatus such for example as simulators used for training, research, leisure or entertainment. FIG. 2 shows how the mirror film 6 is attached to the lower edge 4 of the suction chamber 2.

In the method of constructing the thin film mirror shown in FIGS. 1 and 2, the mirror film 6 must stretch in going from a cone to a sphere. In vertical section, the mirror film 6 must stretch from a straight line to a circular arc. In horizontal section, the mirror film 6 must stretch from a circular arc to a longer circular arc. Where the mirror film 6 is attached to the edges 4, the mirror film 6 cannot stretch parallel to the edges 4. Thus the stretch is not uniform across the mirror film 6. This reduced stretch near the edges of the mirror film 6 results in locally lower tension in the film, and a departure from the ideal shape.

Figure 3:
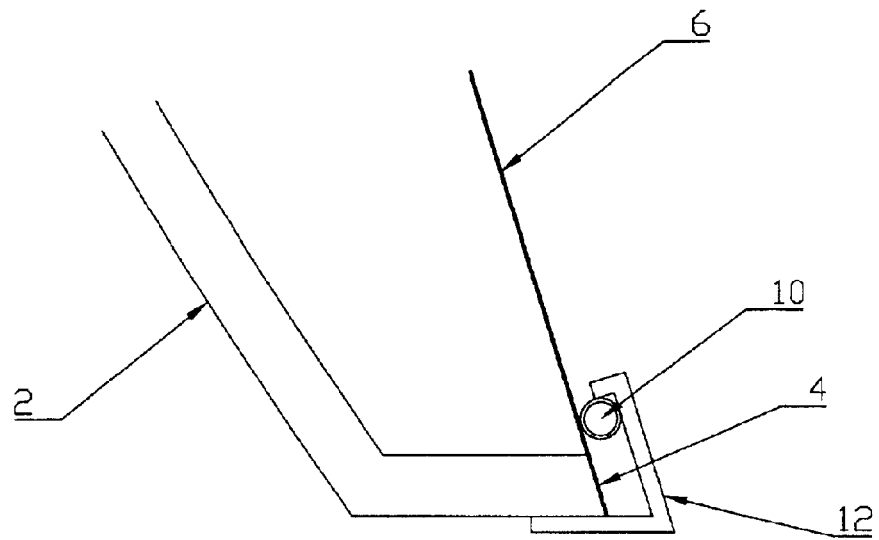
FIG. 3 is a view similar to FIG. 2 but shows how the method of the present invention is used to attach mirror film to the suction chamber.

Referring now to FIG. 3, there is shown the suction chamber 2, the mirror film 6, tensioning means in the form of a semi-rigid tube 10, and holding means in the form of a clamp 12. As shown, the clamp 12 has a first portion for extending over the tube 10, and a second portion for extending under the suction chamber 2. With the method of the invention as shown in FIG. 3, the tube 10 is just in contact with the mirror film 6 adjacent at least one of the edges 4 of the suction chamber 2.

Figure 4:
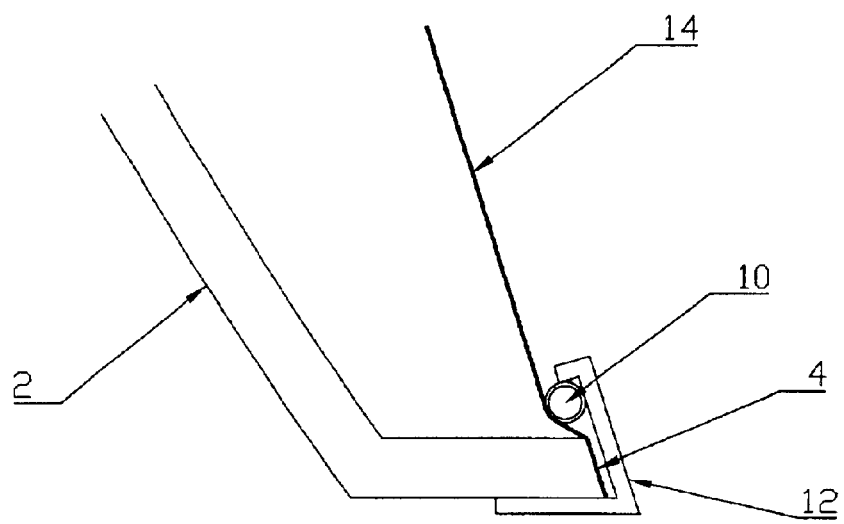
FIG. 4 is a view similar to FIG. 3 and shows how the method of the present invention is used to increase tension in the mirror film parallel to the edge.

With the method of the invention as shown in FIG. 4, the tube 10 is forced into contact with mirror film 14 adjacent at least one of the edges 4 of the suction chamber 2, such that in horizontal section the tube 10 is fed in to a longer circular arc, and such that tension in the mirror film 14 parallel to the edge 4 is increased. The clamp 12 holds the tube 10 in position. The clamp 12 is available for locally adjusting clamping pressure on the tube 10 such that local tension in the mirror film 14 parallel to the edge 4 is adjusted.

It is to be appreciated that the embodiments of the invention described above with reference to the accompanying drawings have been given by way of example only and that modifications may be effected. Thus, for example, a different type of holding means to the clamp 12 may be employed. Also, a different type of tensioning means to the semi-rigid tube 10 may be employed so that, for example, the tensioning means may be solid rather than hollow.

What is claimed is:

1. A method of constructing a thin film mirror, which method comprises the steps of:

(i) providing a suction chamber with edges which lie on a surface of the thin film mirror being constructed;

(ii) providing tensioning means which is forced into contact with a film which is for the thin film mirror being constructed, the tensioning means being positioned adjacent to and inwardly of at least one of the edges of the suction chamber such that tension in the film parallel to the edge is increased by the tensioning means moving the film in a direction into the suction chamber; and (iii) providing holding means for
   (a) holding the tensioning means;
   (b) locally adjusting holding pressure on the tensioning means; and
   (c) feeding the tensioning means into position after the film has been attached to the suction chamber.

2. A method according to claim 1 in which the tensioning means is a rod.

3. A method according to claim 2 in which the rod is of circular cross section.

4. A method according to claim 3 in which the rod is a tube.

5. A method according to claim 4 in which the tube is a semi-rigid tube.

6. A method according to claim 1 in which the holding means has a first portion for extending over the tensioning means, and a second portion for extending under the suction chamber.

7. A thin film mirror produced by the method according to claim 1.

* * * * *